United States Patent
Needelman et al.

(10) Patent No.: US 8,019,544 B2
(45) Date of Patent: Sep. 13, 2011

(54) REAL-TIME REFINEMENT METHOD OF SPACECRAFT STAR TRACKER ALIGNMENT ESTIMATES

(75) Inventors: David D. Needelman, Torrance, CA (US); Rongsheng Li, Hacienda Heights, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 1459 days.

(21) Appl. No.: 11/028,094

(22) Filed: Jan. 3, 2005

(65) Prior Publication Data
US 2006/0149474 A1    Jul. 6, 2006

(51) Int. Cl.
*G01C 21/00*    (2006.01)
(52) U.S. Cl. .................. 701/222; 701/3; 701/4; 701/13; 701/207; 701/224; 701/226
(58) Field of Classification Search .................. 701/207, 701/222, 226, 4, 13, 45, 301, 48, 70, 79, 701/91, 3, 224; 348/117; 280/806; 244/164, 244/171; 342/355; 180/268, 282
See application file for complete search history.

(56) References Cited

U.S. PATENT DOCUMENTS

| | | | |
|---|---|---|---|
| 5,552,986 A * | 9/1996 | Omura et al. | 701/45 |
| 6,085,137 A * | 7/2000 | Aruga et al. | 701/51 |
| 6,272,432 B1 * | 8/2001 | Li et al. | 701/222 |
| 6,275,677 B1 * | 8/2001 | Tandler | 455/12.1 |
| 6,470,270 B1 * | 10/2002 | Needelman et al. | 701/222 |
| 6,512,979 B1 * | 1/2003 | Needelman et al. | 701/222 |
| 6,629,672 B1 * | 10/2003 | Goodzeit et al. | 244/171 |
| 6,691,033 B1 * | 2/2004 | Li et al. | 701/222 |
| 7,028,802 B2 * | 4/2006 | Tobata | 180/268 |
| 2003/0009284 A1 * | 1/2003 | Needelman et al. | 701/222 |
| 2004/0098178 A1 * | 5/2004 | Brady et al. | 701/4 |

FOREIGN PATENT DOCUMENTS

DE    19749857 A1 *    5/1999

* cited by examiner

*Primary Examiner* — Khoi Tran
*Assistant Examiner* — Jorge Peche
(74) *Attorney, Agent, or Firm* — Ostrager Chong Flaherty & Broitman P.C.

(57) ABSTRACT

A method of estimating the alignment of a star sensor (20) for a vehicle (12) includes generating star tracker data. A vehicle attitude and a star sensor attitude are determined in response to the star tracker data. A current alignment sample is generated in response to the vehicle attitude and the star sensor attitude. A current refined estimate alignment signal is generated in response to the current alignment sample and a previously refined estimate alignment signal via a vehicle on-board filter (38).

9 Claims, 3 Drawing Sheets

REAL-TIME REFINEMENT METHOD OF SPACECRAFT STAR TRACKER ALIGNMENT ESTIMATES

FEDERAL RESEARCH STATEMENT

This invention was made with Government support. The Government has certain rights in this invention.

TECHNICAL FIELD

The present invention relates generally to attitude, angular velocity, and sensor alignment estimate adjustment for a vehicle. More particularly, the present invention relates to calibration and alignment of star sensors.

BACKGROUND ART

Satellites and other vehicles are in widespread use for various purposes including scientific research and communications. Many scientific and communications missions, however, cannot be accurately fulfilled without the consistent monitoring and controlling of the 3-axis attitude and angular velocity of a vehicle. In many applications, a vehicle must be oriented to transmit signals in a particular direction or to receive signals from a specifically located source. Furthermore, in such applications, the angular velocity of the vehicle must be appropriate to maintain a desired orientation over time. Without accurate control of the 3-axis attitude and angular velocity of a vehicle, the transmission or reception of such signals is hindered and can be unachievable.

Such control requires systems for 3-axis attitude and angular velocity determination, which generally include one or more star trackers or star sensors and a 3-axis gyroscope. During normal operation, the 3-axis gyroscope is used to provide angular velocity information and the star sensors combined with the 3-axis gyroscope are used to provide attitude information. The attitude estimate accuracy is affected by errors in the star sensor and gyro data, and errors resulting from inaccurate knowledge of the star sensor orientation with respect to the body of a vehicle, as defined by the orientation of the 3-axis gyroscope. As these errors are inherent and time varying, it is often necessary to constantly estimate such errors in order to compensate for them.

As a baseline, attitude determination is often performed using data from the star sensors. Orientation of the star sensors can shift over time with respect to the body of a vehicle. These shifts are small, typically approximately several hundreds of arc-seconds in duration and size, and can occur due to thermal effects. Due to the duration and size of the shifts they are difficult to measure on the ground.

The accuracy of the attitude determination varies depending upon the mission and phase of that mission. Certain phases of a mission require that the orientations of the star sensors be known precisely such that errors in the stated orientations can be compensated to provide accurate attitude determination. Thus, occasional measurements of star sensor data are acquired by a ground-team then post-processed to calibrate the star sensor alignments. The star sensor alignments may be moderately or finely calibrated using batch processing of star sensor data.

Ground-based calibration requires a cumbersome process that includes: dedicated orbital passes to gather tracker data telemetered over long periods, approximately one day in length; batch-processing of the tracker data; and vehicle alignment uploads. Ground-based calibration also requires expensive software tools for processing of the tracker data and training of ground personnel to perform the calibration and usage of the tools.

Also, when the vehicle experiences "out-of-contact" periods, such as when telemetry is unavailable, which can often occur with certain satellites the calibration process is hindered. During such periods large blocks of data must be buffered on-board and then transmitted in chunks. This can negatively affect the accuracy of the data and can delay performance of mission tasks.

Thus, there exists a need for an improved system and method of calibrating and estimating the alignments of star sensors.

SUMMARY OF THE INVENTION

In one embodiment of the present invention, a method of estimating the alignment of a star sensor for a vehicle is provided. The method includes the generation of star tracker data. A vehicle attitude and a star sensor attitude are determined in response to the star tracker data. A current alignment sample is generated in response to the vehicle attitude and the star sensor attitude. A current refined estimate alignment signal is generated in response to the current alignment sample and a previously refined estimate alignment signal via a vehicle on-board filter.

In another embodiment of the present invention, an estimation of the accuracy of the above alignment method is determined, as well as a specified time when the above alignment method can be terminated.

In yet another embodiment of the present invention, a method of calibrating the alignment of a star sensor for a vehicle is provided. The calibration method is similar to the alignment method above, but further includes the replacement of reference alignment values of the star sensor with values of the refined estimated alignment. The reference alignment values may be utilized by various on-board modules of the vehicle in the performance of mission tasks.

The embodiments of the present invention provide several advantages. A couple of such advantages are the provisions of estimating and calibrating the alignment of star sensors onboard a vehicle without ground intervention. In so providing, the stated embodiments eliminate the need for time-consuming, risky, and expensive ground intervention when performing a star sensor alignment calibration. The stated embodiments eliminate the need for: dedicated orbital passes to gather tracker data telemetered over long periods of approximately one day in length; batch-processing of the tracker data; implementation of expensive software tools for such processing, training of ground support teams in performing star tracker alignment calibration and use of the software tools, and uploading of alignments to a spacecraft.

Another advantage provided by an embodiment of the present invention is the provision of sharing onboard components and modules for star tracker alignment calibration as well as the performance of tasks associated with normal operation of a spacecraft. In so doing, the stated embodiment increases feasibility of performing star tracker alignment calibration onboard the spacecraft.

Yet another advantage provided by an embodiment of the present invention is ability to perform star tracker alignment calibration onboard a spacecraft without interfering with normal operation of the spacecraft. Thus, for example, spacecraft attitude determination may be performed simultaneously with star tracker alignment calibration without hindrance or delay of the determination.

DETAILED DESCRIPTION

Figure 1:
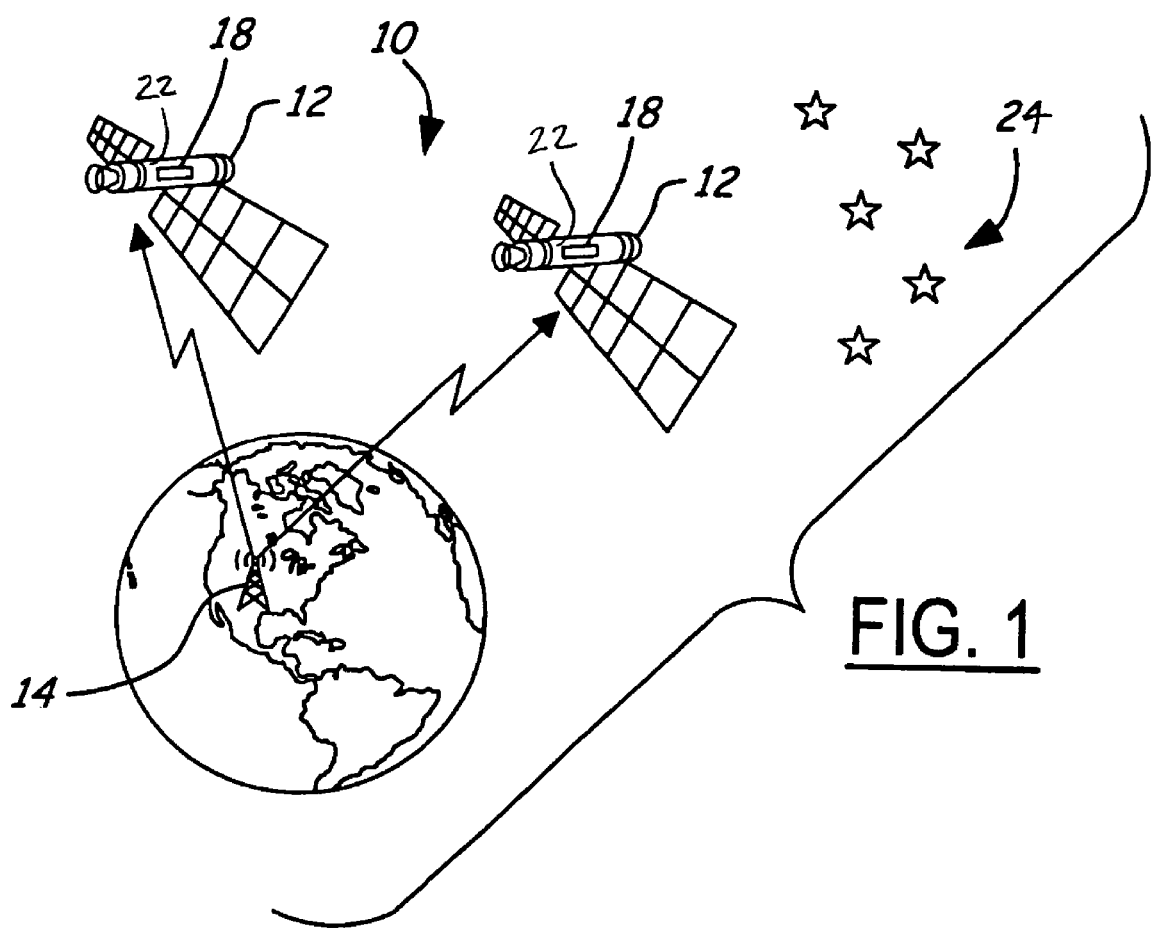
FIG. 1 is a perspective view of a set of vehicles (depicted as a satellite system), each of which incorporating a star tracker alignment calibration system in accordance with an embodiment of the present invention.

In the following figures the same reference numerals will be used to identify the same components. While the present invention is described primarily with respect to an onboard method of calibrating alignment of star sensors, the present invention may be adapted and applied in various vehicle applications. The present invention may be applied throughout various spacecraft missions and may be utilized without ground intervention to estimate alignment of and to calibrate the alignment of star sensors.

Figure 2:
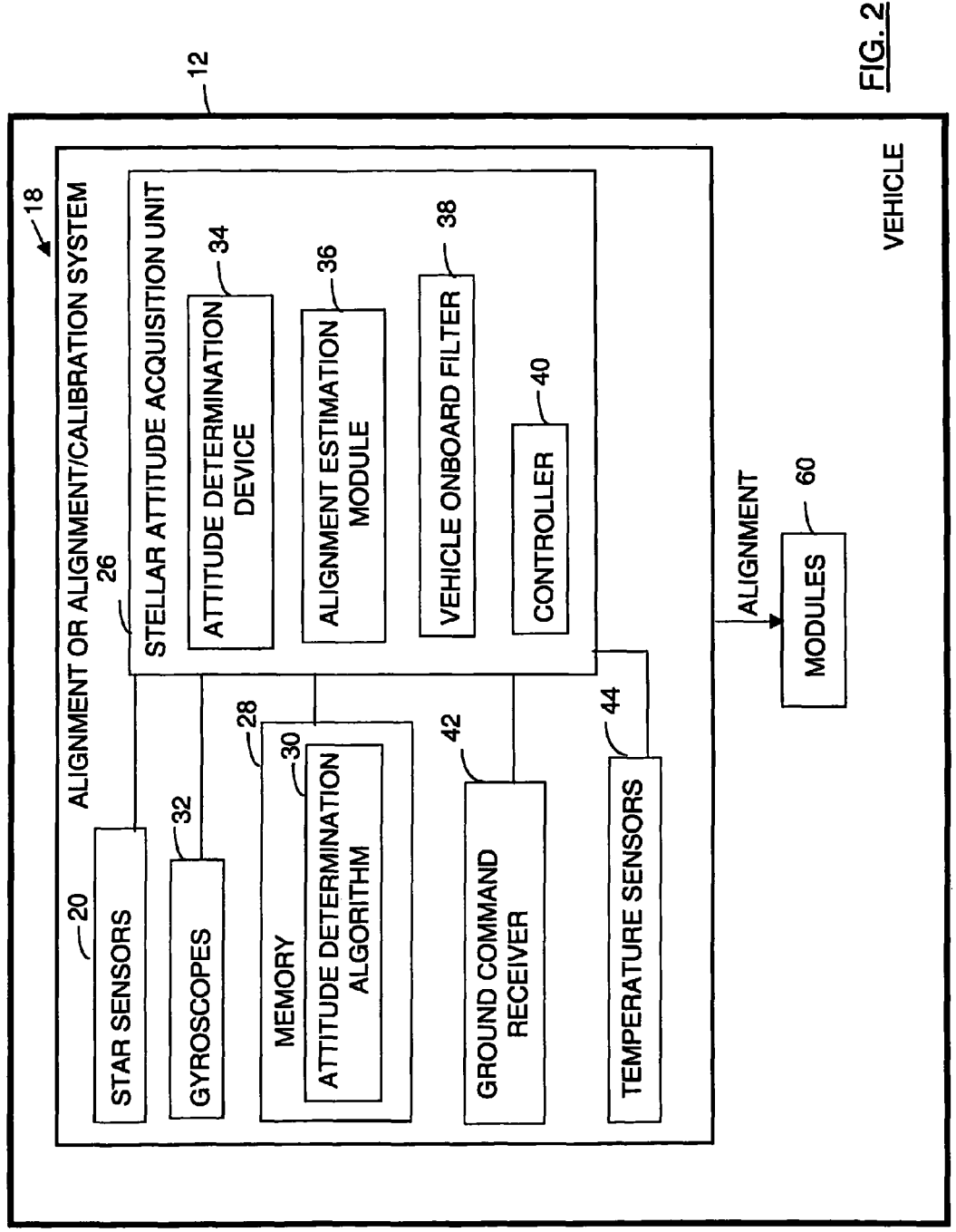
FIG. 2 is a block diagrammatic view of the star tracker alignment calibration system of FIG. 1.

Referring now to FIG. 1, a perspective view of a set of vehicles (depicted as a satellite system), each of which incorporating a star tracker alignment calibration system in accordance with an embodiment of the present invention is shown. The system 10 includes one or more vehicles 12, which may be in the form of satellites as shown or may be in some other form known in the art. Although not required, the vehicles 12 may be in communication with a ground station 14. Each vehicle 12 includes the star tracker alignment estimation system 18 for estimating or determining and calibrating the alignment of star trackers or star sensors 20 on the vehicles 12. The star sensors 20 are seen in FIG. 2. The term "alignment" refers to the orientation of the star sensors 20 relative to an associated vehicle body 22. The attitude of the body 22 is also determined based upon the position of the stars 24.

Referring now also to FIG. 2, a block diagrammatic view of the estimation system 18 is shown. The estimation system 18 includes the star sensors 20, a stellar attitude acquisition (SAA) unit 26, and a memory 28. The star sensors 20 are used to track star positions and patterns for attitude determination. The SAA unit 26 estimates the attitude of the vehicle 12 and the alignment of the star sensors 20 using data from the star sensors 20 and data collected from the attitude determination algorithms 30 stored in the memory 28. The SAA unit 26 estimates alignment of the star sensors 20 or estimates alignment and calibrates the alignment thereof onboard the vehicle 12 without ground intervention utilizing the star sensor data and the attitude of the vehicle 12. The estimation system 18 may also include gyroscopes 32, which are used for angular velocity information pertaining to the vehicle 12.

The SAA unit 26 includes an attitude determination device 34, an alignment estimation module 36, a vehicle onboard filter 38, and a controller 40. The attitude determination device 34 uses the star sensor data along with the attitude determination algorithms 30 to determine attitude of the vehicle 12 relative to inertial space. The alignment estimation device 36 determines alignment of the star sensors 20 with respect to the vehicle 12. The filter 38 aids in the generation of an evolving alignment estimate for each star sensor 20. The evolving alignment estimate measurably improves with each "sample." A sample refers to a calculated alignment based on one or more frames of star sensor data and the attitude estimate for the vehicle 12. The controller 40 calibrates the alignment of the star sensors 20 using information contained within the samples. This is explained in greater detail below with respect to the embodiment of FIG. 3.

The attitude determination algorithms 30 may have different or varying accuracy levels that are associated with particular mission phases. The attitude determination algorithms 30 may be of the stellar inertial attitude determination (SIAD) type or may be of some other type known in the art. The attitude determination algorithms 30 may include lost-in-space algorithms, Kalman filter-based algorithms, or other attitude determination algorithms known in the art. The Kalman filter-based algorithms utilize information from one or more of the star sensors 20. When utilizing a Kalman filter-based algorithm the estimation system 18 may be considered to be operating in a "normal mode".

The attitude determination device 34, the alignment estimation device 36, the filter 38, and the controller 40 may be microprocessor based such as a computer having a central processing unit, memory (RAM and/or ROM), and associated input and output buses. The attitude determination device 34, the alignment estimation device 36, the filter 38, and the controller 40 may be microprocessor based or software based. The attitude determination device 34, the alignment estimation device 36, the filter 38, and the controller 40 may be formed of application-specific integrated circuits or may be formed of other logic devices known in the art. The attitude determination device 34, the alignment estimation device 36, the filter 38, and the controller 40 may be a portion of a central vehicle main control unit, an interactive vehicle dynamics module, or may be stand-alone controllers or devices as shown.

The SAA unit 26, and/or one or more of the components contained therein, may also be in the form of a parallel or multi-tasking processor such that it is capable of performing star sensor alignment calibration simultaneously with and without hindrance or interference of normal operating procedures of the SAA unit 26 and of the vehicle 12.

The system 18 may also include a ground command receiver 42 that receives override signals from the ground station 14. Although the SAA unit 26 is capable of self-estimating the alignment of the star sensors 20 or self-estimating and self-calibrating the alignment of the star sensors 20, the SAA unit 26 may determine alignment of or calibrate the alignment of the star sensors 20 in response to the override signals. The SAA unit 26 may also perform mission tasks or other tasks associated with normal operation of the vehicle 12 in response to the override signals. The SAA unit 26 in calibrating the alignment of the star sensors 20 may replace reference alignment values of the star sensors 20 in response to the override signals or ground originated command signals.

The estimation system 18 may further include temperature sensors 44, which may be utilized to detect thermal changes in star sensor related components. The temperature sensors 44 may generate temperature signals indicative of thermal deformation in the star sensors 20, which may be utilized by the SAA unit 26 or the controller 40 to determine when to estimate the alignment of or when to estimate and calibrate the alignment of one or more of the star sensors 20. The temperature signals may be used by the SAA unit 26 or the controller 40 to revise or determine the alignment estimates.

Figure 3:
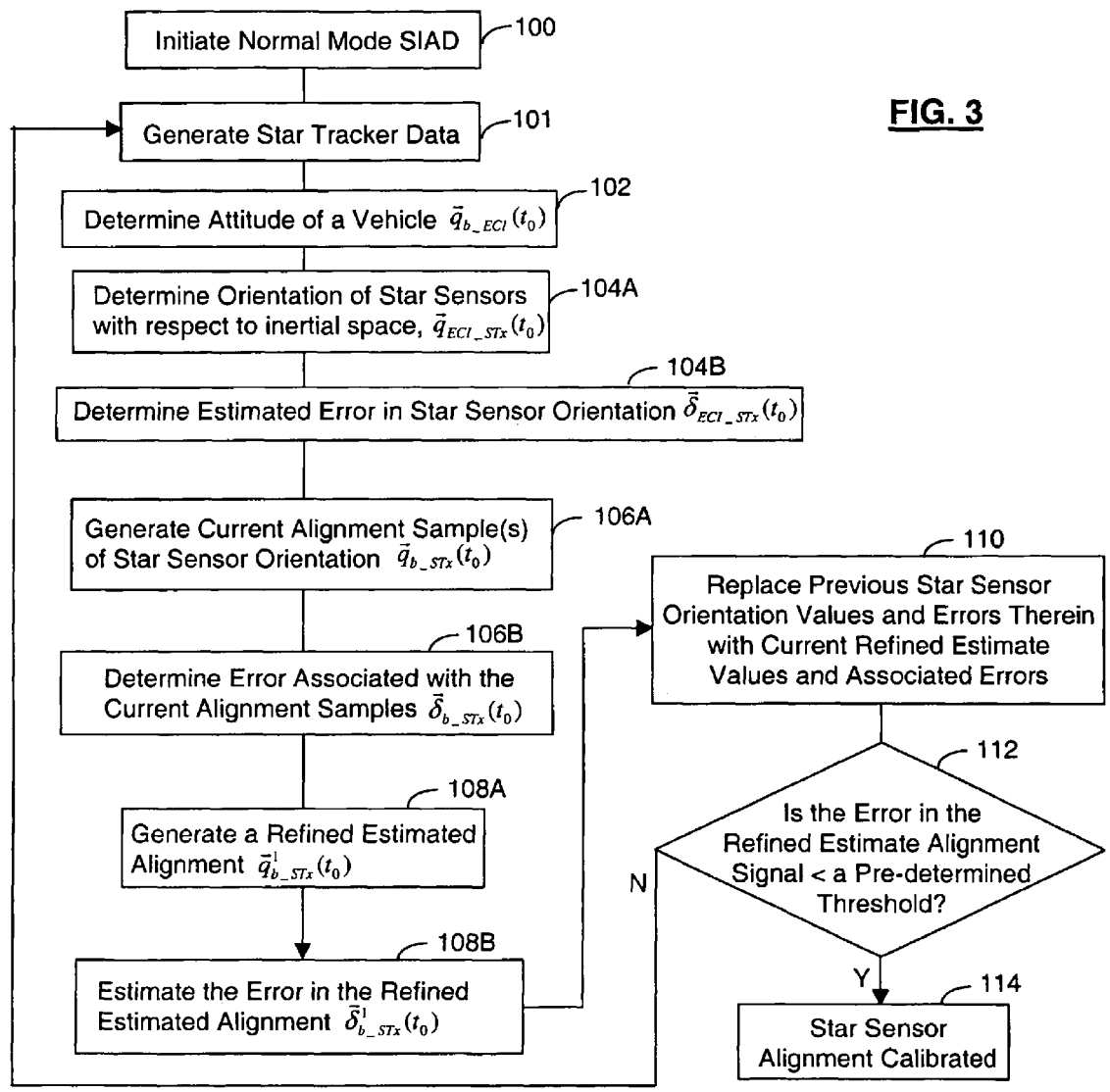
FIG. 3 is a logic flow diagram illustrating a method of calibrating the alignment of a star sensor for a vehicle incorporating a method of estimating alignment of the star sensor in accordance with an embodiment of the present invention.

Referring now to FIG. 3, a logic flow diagram illustrating a method of calibrating the alignment of the star sensors 20 incorporating a method of estimating alignment of the star sensors 20 in accordance with an embodiment of the present invention is shown. The following steps 100-108B may be considered a method of estimating alignments of the star sensors 20. The following steps 110-114 may be considered a method of calibrating the alignments of the star sensors 20.

In step 100, the SAA unit 26 performs an initiation of "normal mode" stellar inertial attitude determination (SIAD), in which star tracker data is used. Several conditions are satisfied prior to the initiation of normal mode SIAD. One such condition is the periodic availability of new data from the star sensors 20. Although any number of star sensors 20 may be used, in one embodiment of the present invention, two star sensors are utilized. Another condition is that there is a preliminary estimate of attitude or orientation with respect to the body of each star sensor 20 at a time $t_o$. As is evident to those skilled in the art, there is a plurality of representations of attitude and orientation. For example, attitude and orientation may be represented by direction cosine matrices, or quaternions. In one embodiment of the present invention, quaternions are used. Star sensor orientation is represented by the quaternion $\vec{q}_{b\_STx}^{0}$, where x is the tracker index. The tracker index x may be any number between one and NumST, where NumST is equal to the total number of star sensors 20. The availability of such quaternions is a prerequisite for entering normal mode SIAD. The SAA unit 26 may utilize star sensor data stored in the memory 28.

Yet another condition that is satisfied prior to entering normal mode SIAD is the availability of an error estimate $\vec{\delta}_{b\_STx}^{0}$, which represents the estimated error in the estimated star sensor orientation $\vec{q}_{b\_STx}^{0}$. Additionally, as another existing condition, an estimate of vehicle attitude or orientation with respect to inertial space, at any time t, where t is in some specified range of values, is available. The vehicle attitude estimate is represented by quaternion $\vec{q}_{b\_ECI}(t)$. The vehicle attitude is assumed to be updated at regular or irregular intervals in response to the data from sensors, such as the 3-axis gyroscope 32 or the star sensors 20. In one embodiment, the vehicle attitude is stored in memory 28. In another embodiment, a set of vehicle attitudes is stored in memory 28 and a specified number of the attitudes forms the set. The variable N is defined to be the number of attitude estimates, where each attitude estimate is associated with a specified time, referred to as $\{t_0, t_1, \ldots, t_N\}$. The set of attitudes available is $\{\vec{q}_{b\_ECI}(t_0), \vec{q}_{b\_ECI}(t_1), \ldots, \vec{q}_{b\_ECI}(t_N)\}$. As is evident to those skilled in the art, to find the attitude $\vec{q}_{b\_ECI}(t)$, where $t_i \leq t \leq t_{i+1}$ and where $i \in \{0, 1, \ldots (N-1)\}$, one can interpolate between the attitudes $\vec{q}_{b\_ECI}(t_i)$ and $\vec{q}_{b\_ECI}(t_{i+1})$. The vehicle attitude quaternion $\vec{q}_{b\_ECI}(t)$ is accurate. In addition, the condition of an estimate of expected error of the vehicle attitude quaternion $\vec{q}_{b\_ECI}(t)$, represented by $\vec{\delta}_{b\_ECI}^{0}(t)$, is available for any time t in the specified range.

The star tracker data may be periodically examined to determine whether buffered data is sufficient to evaluate the tracker frame to inertial space mapping. This mapping may be done using various techniques known in the art, including those techniques provided in U.S. Pat. Nos. 6,470,270 and 6,512,979, such as the lost-in-space algorithm. When data from the star sensors 20 is sufficient the following steps may be performed. The mission requirements determine how much data is sufficient, for example, when four or more stars are identified as corresponding to star catalog entries the data may be considered sufficient In step 101, the star sensors 20 generate star tracker data indicative of the orientation or attitude of the vehicle 12 relative to stars 20, which may be in the form of star track signals.

In step 102, the attitude determination device 34 determines attitude of the vehicle 12 relative to inertial space in response to the star tracker data using one or more of the algorithms 30, which may be in the form of star pattern match algorithms. The attitude may be expressed in a number of representations. In one sample embodiment, attitude is expressed in the form of a vehicle attitude quaternion $\vec{q}_{b\_ECI}(t)$, where t represents the time at which the attitude applies.

In step 104A, the attitude determination device 34 determines the orientation or attitude of the star sensors 20 relative to inertial space. The attitude or orientation, represented by the quaternion $\vec{q}_{ECI\_STx}(t_0)$, is determined using one or more of the algorithms 30, as applied to star tracker data. The star sensor attitude quaternion $\vec{q}_{ECI\_STx}(t_0)$ is determined based on one or more frames of star tracker data, including in one embodiment, a frame at a time $t_0$. In step 104B, $\vec{\delta}_{ECI\_STx}(t_0)$, the expected error in the star sensor attitude quaternion $\vec{q}_{ECI\_STx}(t_0)$, is determined. Step 104A may be performed simultaneously with step 104B.

In step 106A, the alignment estimation module 36 generates a current alignment sample at time $t_0$ of the orientation of the star sensor x with respect to the body 22, represented by quaternion $\vec{q}_{b\_STx}(t_0)$, in response to the vehicle attitude quaternion $\vec{q}_{b\_ECI}(t_0)$ and the star sensor attitude quaternion $\vec{q}_{ECI\_STx}(t_0)$. In one embodiment, the vehicle time matched attitude $\vec{q}_{b\_ECI}(t_0)$, is obtained through the interpolation from a buffered set of vehicle attitude quaternions $\{\vec{q}_{b\_ECI}(t_1), \vec{q}_{b\_ECI}(t_2), \ldots, \vec{q}_{b\_ECI}(t_N)\}$, where $t_1 < t_2 < \ldots < t_N$, and $t_1 \leq t_0 \leq t_N$. The alignment sample may have been generated from multiple frames of star sensor data.

In step 106B, the error associated with the current alignment sample quaternion $\vec{q}_{b\_STx}(t_0)$ is determined and is represented by $\vec{\delta}_{b\_STx}(t_0)$. The sample error $\vec{\delta}_{b\_STx}(t_0)$ is determined in response to the expected vehicle attitude error $\vec{\delta}_{b\_ECI}(t_0)$ from the normal mode SIAD and the estimated error in the star sensor attitude $\vec{\delta}_{ECI\_STx}(t_0)$. In another sample embodiment, the sample error is defined as shown in equation 1, where i is an integer value of 1, 2, or 3. Step 106A may be performed simultaneously with step 106B.

$$([\delta_{b\_STx}(t_0)]_i)^2 = ([\delta_{b\_ECI}(t_0)]_i)^2 + ([\delta_{ECI\_STx}(t_0)]_i)^2 \quad (1)$$

In step 108A, the filter 38 generates a current refined estimate alignment signal of the orientation of the star sensor x with respect to the body 22, which is represented by quaternion $\vec{q}_{b\_SRx}^{1}$. The current refined estimate alignment quaternion $\vec{q}_{b\_STx}^{1}$ is determined in response to the current alignment sample quaternion $\vec{q}_{b\_STx}(t_0)$ and the initial or previous star sensor orientation quaternion $\vec{q}_{b\_STx}^{0}$, which may be referred to as the previously refined estimate alignment signal. Those skilled in the art will realize that there are multiple techniques to derive the current refined estimate alignment quaternion $\vec{q}_{b\_STx}^{1}$. In one embodiment, the determination of current refined estimate alignment quaternion $\vec{q}_{b\_STx}^{1}$ is executed as follows. A sequence of rotations about specified axes in the STx frame [θ₁ θ₂ θ₃] is derived, where θ₁ is the angle of rotation about the STx x-axis, θ₂ is the angle of rotation about the STx y-axis, and θ₃ is the angle of rotation about the STx z-axis. The values of angles θ₁, θ₂, and θ₃ are defined such that this rotation sequence, when applied to the previous star sensor orientation quaternion $\vec{q}_{b\_STx}^{0}$, produces the current refined estimate alignment quaternion $\vec{q}_{b\_STx}(t_0)$.

The current refined estimate alignment quaternion $\vec{q}_{b\_STx}^{1}$ is the quaternion obtained from $\vec{q}_{b\_STx}^{0}$ after a sequence of rotations [k₁θ₁ k₂θ₂ k₃θ₃] about the same specified axes in the STx frame, where k₁, k₂, and k₃ are weighting factors. In one embodiment, the weighting factors k₁, k₂, and k₃ are calculated using the estimated error in star sensor orientation $\vec{\delta}_{b\_STx}^{0}$ and the alignment sample error $\vec{\delta}_{b\_STx}(t_0)$, as shown in equation 2, where i is equal to an integer value of 1, 2, or 3.

$$k_i = \frac{\left([\delta_{b\_STx}^{0}]_i\right)^2}{\left([\delta_{b\_STx}^{0}]_i\right)^2 + \left([\delta_{b\_STx}(t_0)]_i\right)^2} \quad (2)$$

The filter 38 may generate the current refined estimate alignment signal once per mission or any number of times per mission, as desired. In step 108B, the estimate of the error in the refined estimate of tracker x-to-body orientation $\vec{\delta}_{b\_STx}^{1}$ is determined. The estimate is calculated using the estimated error in star sensor orientation $\vec{\delta}_{b\_STx}^{0}$ and the alignment sample error $\vec{\delta}_{b\_STx}(t_0)$. In one embodiment of this invention, each component of the estimated error $\vec{\delta}_{b\_STx}^{1}$, as shown in equation 3, may be calculated using equation 4, where i is equal to an integer value of 1, 2, or 3.

$$\vec{\delta}_{b\_STx}^{1} = \left([\delta_{b\_STx}^{1}]_1 [\delta_{b\_STx}^{1}]_2 [\delta_{b\_STx}^{1}]_3\right) \quad (3)$$

$$[\delta_{b\_STx}^{1}]_i = \sqrt{\frac{1}{\left(\frac{1-k_i}{[\delta_{b\_STx}^{0}]_i}\right)^2 + \left(\frac{k_i}{[\delta_{b\_STx}(t_0)]_i}\right)^2}} \quad (4)$$

In step 110, the controller 40 replaces the initial or previous star sensor orientation quaternion $\vec{q}_{b\_STx}^{0}$ with the current refined estimate alignment quaternion $\vec{q}_{b\_STx}^{1}$ for use as the newly updated reference star orientation or calibrated alignment. Also, the estimated error in star sensor orientation $\vec{\delta}_{b\_STx}^{0}$ is replaced with the estimated error in the refined estimate of tracker x-to-body orientation $\vec{\delta}_{b\_STx}^{1}$. The controller 40 may autonomously perform the stated replacements or may perform such replacements in response to a ground command. A metric indicating quality of a plurality of tracker alignments is calculated. In one embodiment, the metric is the maximum value of the star sensor orientation $\|\vec{\delta}_{b\_STx}^{0}\|$, i.e., the maximum value of the magnitude of star sensor orientation $\vec{\delta}_{b\_STx}^{0}$, determined over the set x={1, 2, ..., NumST}. Alternatively, another acceptable metric that may be used is the maximum absolute value of some single component of star sensor orientation $\vec{\delta}_{b\_STx}^{0}$, again determined over the set x={1, 2, ..., NumST}.

In step 112, the metric is compared with a pre-determined threshold. The selected threshold depends on the star sensor alignment accuracy desired. When the metric is less than a pre-determined threshold for the star sensors 20, the star sensors 20 are considered calibrated, as represented by box 114. When the star sensors 20 are not calibrated the SAA unit 26 returns to step 101. The SAA unit 26 may also end or terminate the calibration of one or more of the star sensors 20 based on other conditions, such as when the time period since the beginning of the process exceeds a predetermined threshold. Steps 101-112 may be performed any number of times. A further refined alignment estimate and a further refined estimate in alignment error are obtained with each cycle.

The above-described steps are meant to be illustrative examples; the steps may be performed sequentially, synchronously, simultaneously, or in a different order depending upon the application. The above-described steps may be performed as often as desired. For example, when thermal deformation causes frequent shifts in tracker alignment, the steps may be performed periodically throughout a mission to adjust for the deformation. It should also be noted that the steps described above may all be performed onboard the spacecraft or vehicle 12 and in response to signals originated and generated onboard the vehicle 12 or from non-ground based command signals. This aids in the elimination of timing problems and errors associated with the transmission of information from the ground station 14.

The present invention provides a cost benefit in that it eliminates the need for and replaces the use of expensive ground procedures with an inexpensive onboard procedure. The present invention allows for quicker, more reliable, and continuous star sensor alignment without the approximate one day in delay to gather tracker data for a dedicated orbital pass. The present invention eliminates the need for batch-processing of such data, the implementing of expensive software tools for such processing, the training of ground personnel in the use of such tools and procedures, and the generating of ground based commands including alignment calibration signals and the uploading thereof.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method of estimating the alignment of at least one star sensor for a spacecraft, wherein said at least the star sensor resides in said vehicle comprising:
   determining the alignment of said at least one star sensor with respect to an associated body of a vehicle on which the at least one star sensor resides by the steps comprising generating star tracker data from said at least one star sensor determining vehicle attitude in response to star tracker data;
   determining star sensor attitude of the at least one star sensor in response to said star tracker data;
   generating at least one current alignment sample of the at least one star sensor in response to said vehicle attitude and said star sensor attitude; generating a current refined estimate alignment signal of the at least one star sensor in response to said at least one current alignment sample and a previously refined estimate alignment signal via a vehicle onboard filter.

2. A method as in claim 1 wherein said star sensor attitude is determined in response to at least one star pattern match algorithm.

3. A method as in claim 1 wherein generating at least one current alignment sample is performed recursively.

4. A method as in claim 1 wherein generating a current refined estimate alignment signal is performed recursively.

5. A method as in claim 1 wherein generating a current refined estimate alignment signal comprises generating a weighted average of said at least one current alignment sample with said previously refined estimate alignment signal.

6. A method as in claim 5 wherein generating a weighted average recursively.

7. A method as in claim 1 further comprising determining an estimated error of said current refined estimate alignment signal.

8. A method as in claim 1 wherein said at least one alignment sample comprises consecutive frames of star sensor data.

9. A method as in claim 1 wherein said at least one alignment sample comprises current attitude estimation of the at least one star sensor relative to the body of the vehicle.

* * * * *